(12) United States Patent
Ku et al.

(10) Patent No.: US 10,139,607 B2
(45) Date of Patent: Nov. 27, 2018

(54) LIGHTWEIGHT 3D STEREOSCOPIC SURGICAL MICROSCOPE

(71) Applicant: Visionnaire Medtech Co., Ltd., Changhua, Changhua County (TW)

(72) Inventors: Ming-Chou Ku, Changhua County (TW); Kai-Che Liu, Changhua County (TW); Kun-Wei Lin, Changhua County (TW); Ivan Ku, Changhua County (TW); Shih-Chi Chan, Changhua County (TW); Tong-Wen Wang, Changhua County (TW); Tsuan-Kao Lin, Changhou County (TW); I-Chun Lee, Changhua County (TW)

(73) Assignee: Visionnaire Medtech Co., Ltd., Changhua, Changhua County (TW)

( * ) Notice: Subject to any disclaimer, the term of this patent is extended or adjusted under 35 U.S.C. 154(b) by 358 days.

(21) Appl. No.: 15/172,728

(22) Filed: Jun. 3, 2016

(65) Prior Publication Data

US 2017/0351072 A1 Dec. 7, 2017

(51) Int. Cl.
*G02B 21/00* (2006.01)
*G02B 21/22* (2006.01)
*G02B 21/36* (2006.01)

(52) U.S. Cl.
CPC ..... *G02B 21/0012* (2013.01); *G02B 21/0008* (2013.01); *G02B 21/22* (2013.01); *G02B 21/368* (2013.01)

(58) Field of Classification Search
None
See application file for complete search history.

(56) References Cited

U.S. PATENT DOCUMENTS 6,522,906 B1 * 2/2003 Salisbury, Jr. ......... A61B 1/313
600/102

* cited by examiner

*Primary Examiner* — Anand S Rao
*Assistant Examiner* — Tyler B Edwards
(74) *Attorney, Agent, or Firm* — C. G. Mersereau; Nikolai & Mersereau, P.A.

(57) ABSTRACT

A lightweight 3D stereoscopic surgical microscope has a body, a robot set, an image set, and an operating set. The body has a wheel seat, a housing mounted on the wheel seat, and a host computer mounted in the housing. The robot set is connected to the body and has a base mounted on the housing, a transversal lever mounted on the base, a lifting arm connected to the transversal lever, and a rotating arm connected to the lifting arm. The image set is connected to the robot set and has an outer casing connected to the rotating arm, at least one objective lens mounted in the outer casing, a main display screen mounted on the outer casing, an auxiliary display screen mounted beside the body. The operating set is connected to the robot set, is connected to the body and the image set and has two operating bars.

18 Claims, 6 Drawing Sheets

LIGHTWEIGHT 3D STEREOSCOPIC SURGICAL MICROSCOPE

BACKGROUND OF THE INVENTION

1. Field of the Invention

The present invention relates to a surgical microscope, and more particularly to a lightweight 3D stereoscopic surgical microscope that can reduce a total volume of the surgical microscope for convenience in storage and transport and can provide medical education to many people without being limited by the number of eyepiece sets of the surgical microscope to improve the medical practicability of the surgical microscope.

2. Description of Related Art

With the rapid development of technology, there is significant progress in medical technology, and a 3D stereoscopic imaging technology is a very popular topic in the medical technology and can be applied in the clinical surgery. Then, the doctors can cut, remove or treat organs or tissues of complex and varied thicknesses, and this is a great help for the inspection and treatment of diseases. So the doctors can perform surgery more easily and accurately to significantly enhance the quality of the treatment. Therefore, various types of 3D stereoscopic surgical microscope are presented in the market currently.

A conventional 3D stereoscopic surgical microscope such as Leica UTL 500 can provide 3D images to the doctors for surgery or treatment, but the conventional 3D stereoscopic surgical microscope is large in volume and heavy in weight. When the doctors want to move the conventional 3D stereoscopic surgical microscope during surgery, a larger space is required for movement and operation and this will influence the fluency and efficiency of surgery. In addition, the conventional 3D stereoscopic surgical microscope has a body, a cantilever, a lens set, and at least two eyepiece sets. The cantilever is connected to the body, extends out of the body and has a free end. The lens set is connected to the free end of the cantilever to capture images of the human body or tissue. The at least two eyepiece sets are connected to the lens set to enable the doctors to observe the images captured by the lens set via the at least two eyepiece sets.

Furthermore, the medical technology can be taught and passed down only by books or documented knowledge, but experience in clinical practice is more important. However, the number of the eyepiece sets is limited, and this is unfeasible for many people to simultaneously and instantaneously observe the surgery in process via the at least two eyepiece sets for medical education, and the doctors only explain and illustrate the surgery situation by images after the end of surgery. Therefore, the conventional 3D stereoscopic surgical microscope cannot provide immediate images of surgery, organs and tissues of the human body to many people at the same time to pass down clinical experience, and the number of people participating in medical education is limited. Then, the medical practicability of the conventional 3D stereoscopic surgical microscope is also limited.

To overcome the shortcomings, the present invention provides a lightweight 3D stereoscopic surgical microscope to mitigate or obviate the aforementioned problems.

SUMMARY OF THE INVENTION

The main objective of the present invention is to provide a lightweight 3D stereoscopic surgical microscope that can increase convenience and accuracy of using the lightweight 3D stereoscopic surgical microscope and can provide multiple spatial arrangements.

The lightweight 3D stereoscopic surgical microscope in accordance with the present invention has a body, a robot set, an image set, and an operating set. The body has a wheel seat, a housing mounted on the wheel seat, and a host computer mounted in the housing with a program processing interface. The robot set is connected to the body and has a base mounted on the housing, a transversal lever rotatably mounted on the base, a lifting arm pivotally connected to the transversal lever opposite to the base, and a rotating arm rotatably connected to the lifting arm opposite to the transversal lever. The image set is connected to the robot set, is electrically connected to the body, and has an outer casing connected to the rotating arm, at least one objective lens mounted in the outer casing, a main display screen mounted on the outer casing and electrically connected to the host computer, and an auxiliary display screen mounted beside the body and electrically connected to the host computer. The operating set is connected to the robot set, is electrically connected to the body and the image set, and has two operating bars.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
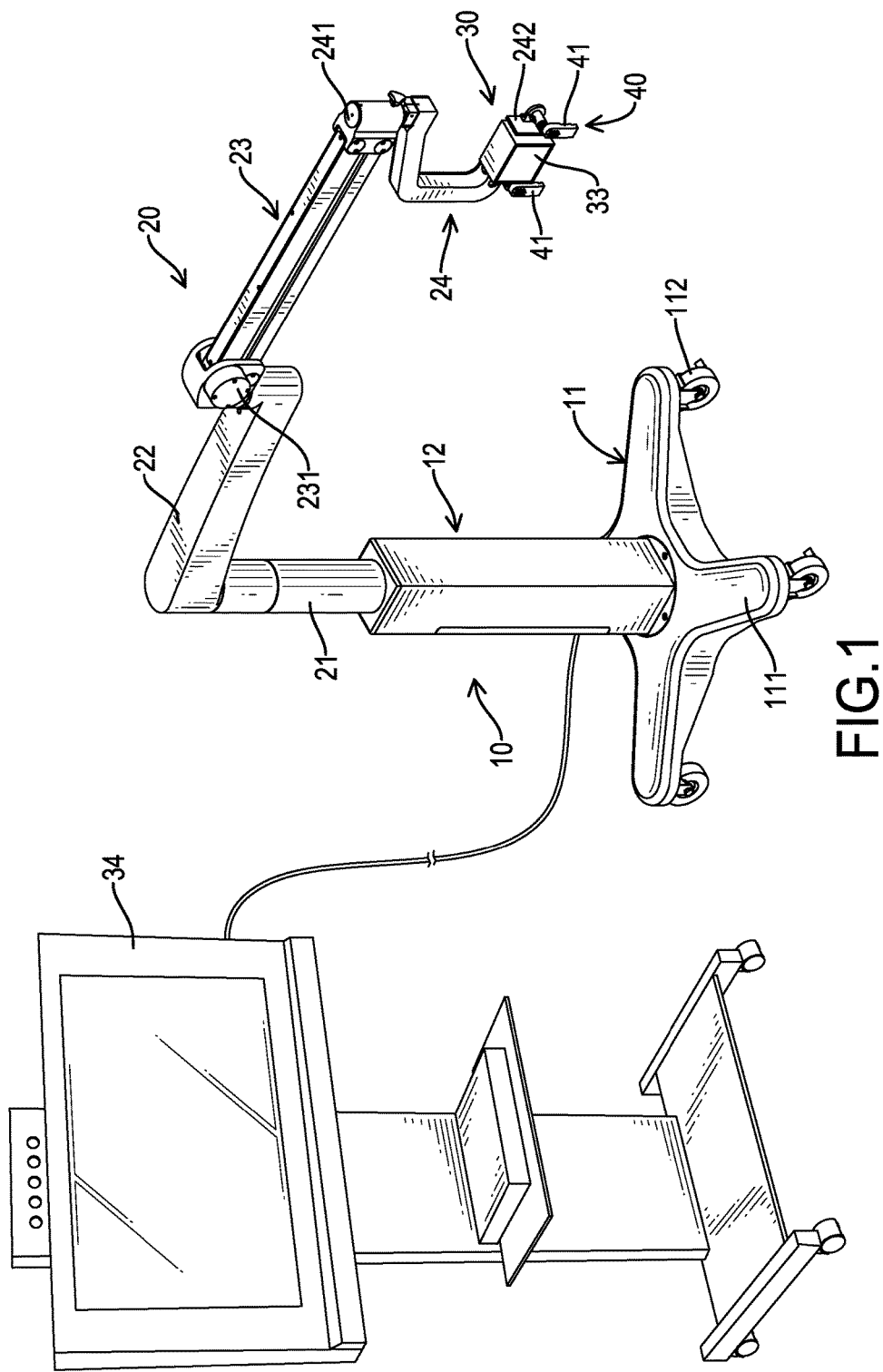
FIG. 1 is a perspective view of a lightweight 3D stereoscopic surgical microscope in accordance with the present invention.
Figure 2:
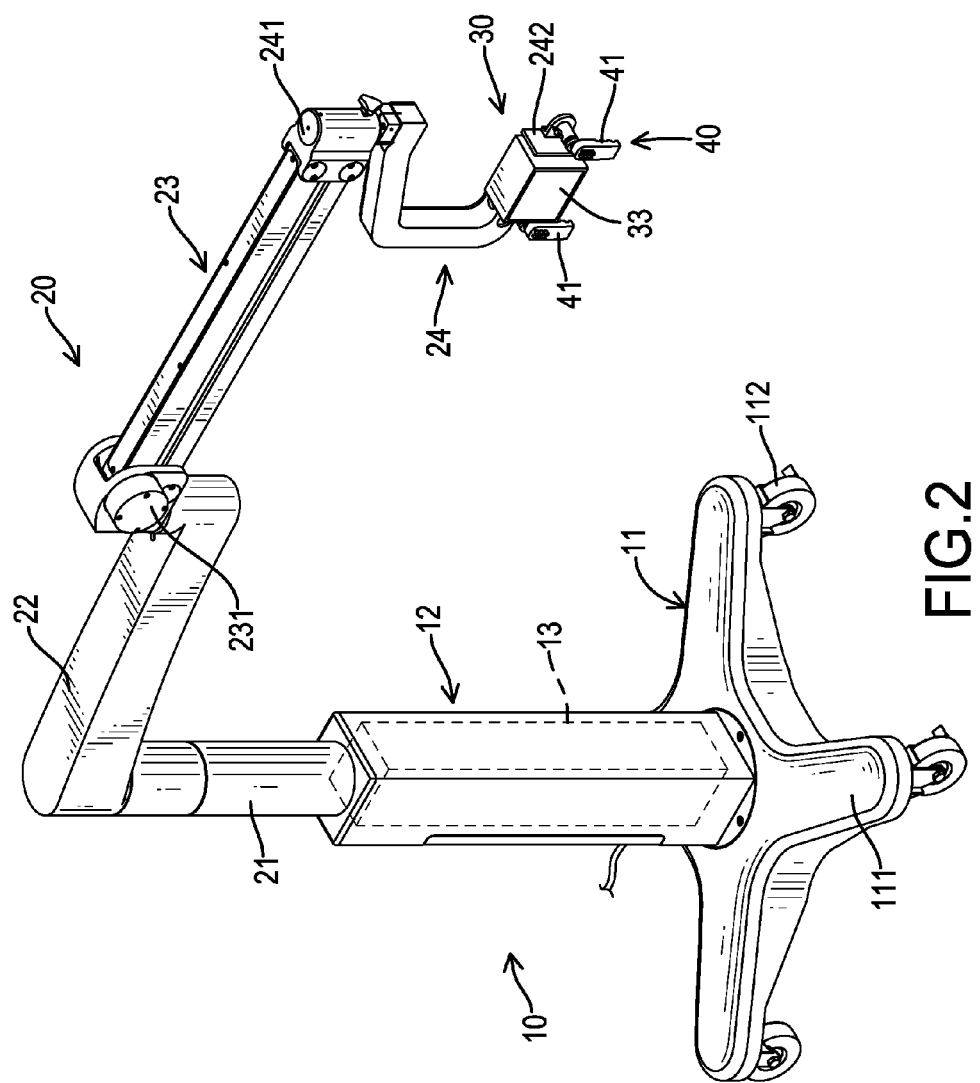
FIG. 2 is an enlarged perspective view of the lightweight 3D stereoscopic surgical microscope in FIG. 1.

With reference to FIGS. 1 and 2, a lightweight 3D stereoscopic surgical microscope in accordance with the present invention has a body 10, a robot set 20, an image set 30, and an operating set 40.

The body 10 has a wheel seat 11, a housing 12, and a host computer 13. The wheel seat 11 has a top, an annular surface, multiple extending legs 111, and multiple wheels 112. The extending legs 111 are radially formed on and protrude from the annular surface of the wheel seat 11, and each one of the extending legs 111 has a free end and a bottom side. Each one of the wheels 112 is securely connected to the bottom side of one of the extending legs 111 at the free end of the corresponding extending leg 111. Then, the wheel seat 11 can be moved by a rotation of the wheels 112.

The housing 12 is an elongated, hollow and square casing, is securely mounted on the top of the wheel seat 11 and has a top side. The host computer 13 is mounted in the housing 12 and has a program processing interface.

The robot set 20 is connected to the body 10 and has a base 21, a transversal lever 22, a lifting arm 23, and a rotating arm 24. The base 21 is securely mounted on the top side of the housing 12 above the wheel seat 11 and has a top end. The transversal lever 22 is rotatably mounted around the top end of the base 21 to transversally move relative to the base 21, and has a mounting end opposite to the base 21.

The lifting arm 23 is pivotally connected to the mounting end of the transversal lever 22, and has a pivot end, a connecting end, and an angle hinge unit 231. The pivot end of the lifting arm 23 is pivotally connected to the mounting end of the transversal lever 22. The connecting end of the lifting arm 23 is opposite to the mounting end of the transversal lever 22. The angle hinge unit 231 is mounted between the mounting end of the transversal lever 22 and the pivot end of the lifting arm 23 to enable the connecting end of the lifting arm 23 to longitudinally move relative to the mounting end of the transversal lever 22.

The rotating arm 24 is rotatably connected to the connecting end of the lifting arm 23, and has a top end, a bottom end, a rotating hinge unit 241, and a connecting frame 242. The top end of the rotating arm 24 is rotatably connected to the connecting end of the lifting arm 23. The rotating hinge unit 241 is mounted between the connecting end of the lifting arm 23 and the top end of the rotating arm 24 to enable the rotating arm 24 to rotate relative to the connecting end of the lifting arm 23. Preferably, the rotating arm 24 may be C-shaped. The connecting frame 242 may be U-shaped and is securely connected to the bottom end of the rotating arm 24 below the rotating hinge unit 241.

Figure 5:
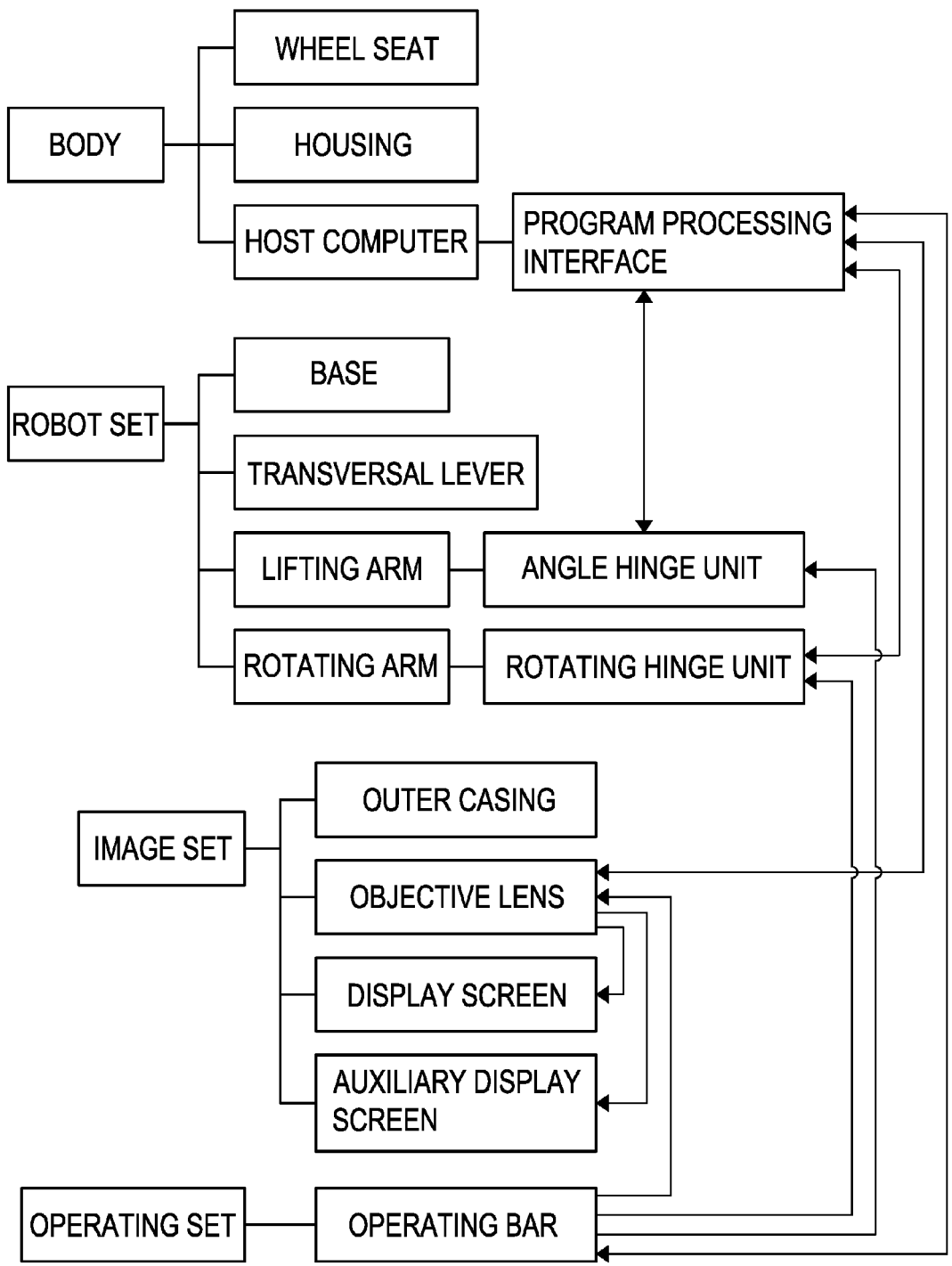
FIG. 5 is a block diagram of the lightweight 3D stereoscopic surgical microscope in FIG. 1.

In addition, with reference to FIG. 5, the robot set 20 is electrically connected to the host computer 13 to enable the host computer 13 to transfer signals to the robot set 20. Then, the transversal lever 22 can be transversally rotated relative to the body 10, the lifting arm 23 can be longitudinally moved upward or downward relative to the body 10, and the rotating arm 24 can be rotated relative to the body 10. With the movement and the rotation of the transversal lever 22, the lifting arm 23, and the rotating arm 24 of the robot set 20, the position of the connecting frame 242 can be adjusted according to a user's need.

Figure 3:
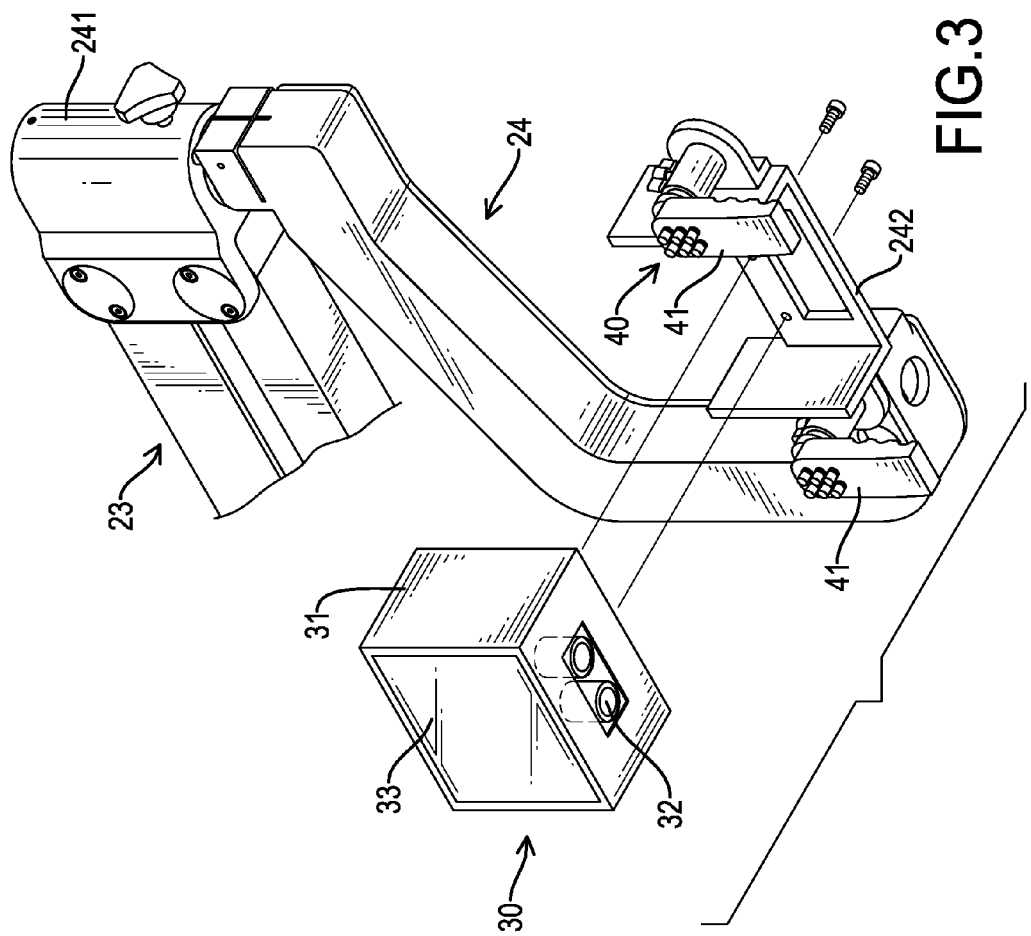
FIG. 3 is an enlarged and exploded perspective view of the lightweight 3D stereoscopic surgical microscope in FIG. 2.
Figure 4:
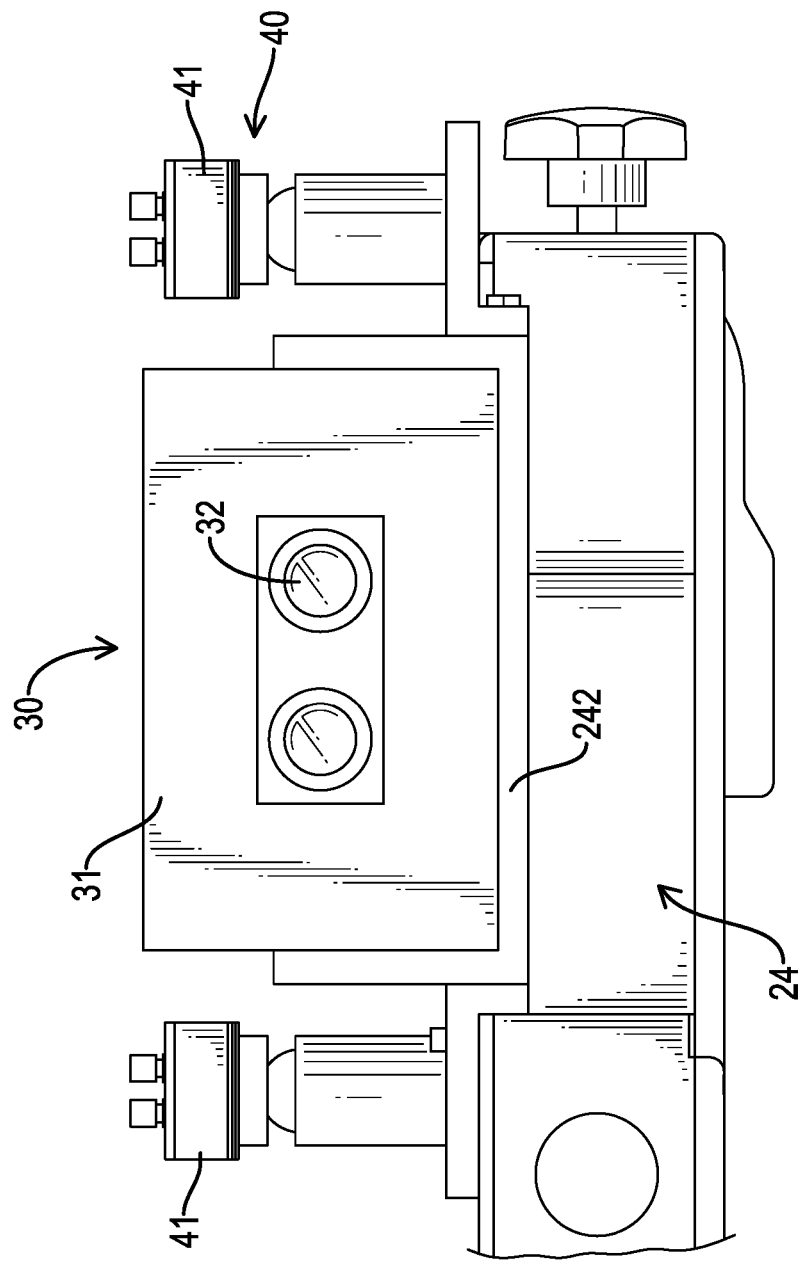
FIG. 4 is an enlarged bottom view of the lightweight 3D stereoscopic surgical microscope in FIG. 2.

With reference to FIGS. 3 and 4, the image set 30 is connected to the robot set 20, is electrically connected to the body 10, and has an outer casing 31, at least one objective lens 32, a main display screen 33, and an auxiliary display screen 34. The outer casing 31 is a hollow square casing, is securely mounted in the connecting frame 242 of the rotating arm 24, and has a bottom face, an outer side, and an opening. The opening is formed through the bottom face of the outer casing 31. The at least one objective lens 32 is mounted in the outer casing 31, and faces the bottom of the outer casing 31 in a range of the opening of the outer casing 31. Then, the at least one objective lens 32 can capture images via the opening of the outer casing 31. Preferably, the image set 30 has two objective lenses 32 mounted in the outer casing 31 at a spaced interval, and each one of the objective lenses 32 may be a Complementary Metal-Oxide-Semiconductor (CMOS) or a Charge-coupled Device (CCD).

The main display screen 33 is securely mounted on the outer side of the outer casing 31 and is electrically connected to the host computer 13 of the body 10. The auxiliary display screen 34 is electrically connected to the host computer 13 beside the body 10 to show an image identical as an image that is displayed on the main display screen 33.

The operating set 40 is connected to the robot set 20, is electrically connected to the body 10 and the image set 30, and has two operating bars 41. The two operating bars 41 are securely mounted on the connecting frame 242 of the rotating arm 24 beside the main display screen 33 of the image set 30. A user or a doctor can control the movement and rotation of the robot set 20 by using the two operating bars 41 and can see a 3D image via the main display screen 33 or the auxiliary display screen 34 by the at least one objective lens 32 capturing images from an object under inspection such as a human or animal and transferring the captured images to the host computer 13 of the body 10 to composite the 3D images.

Figure 6:
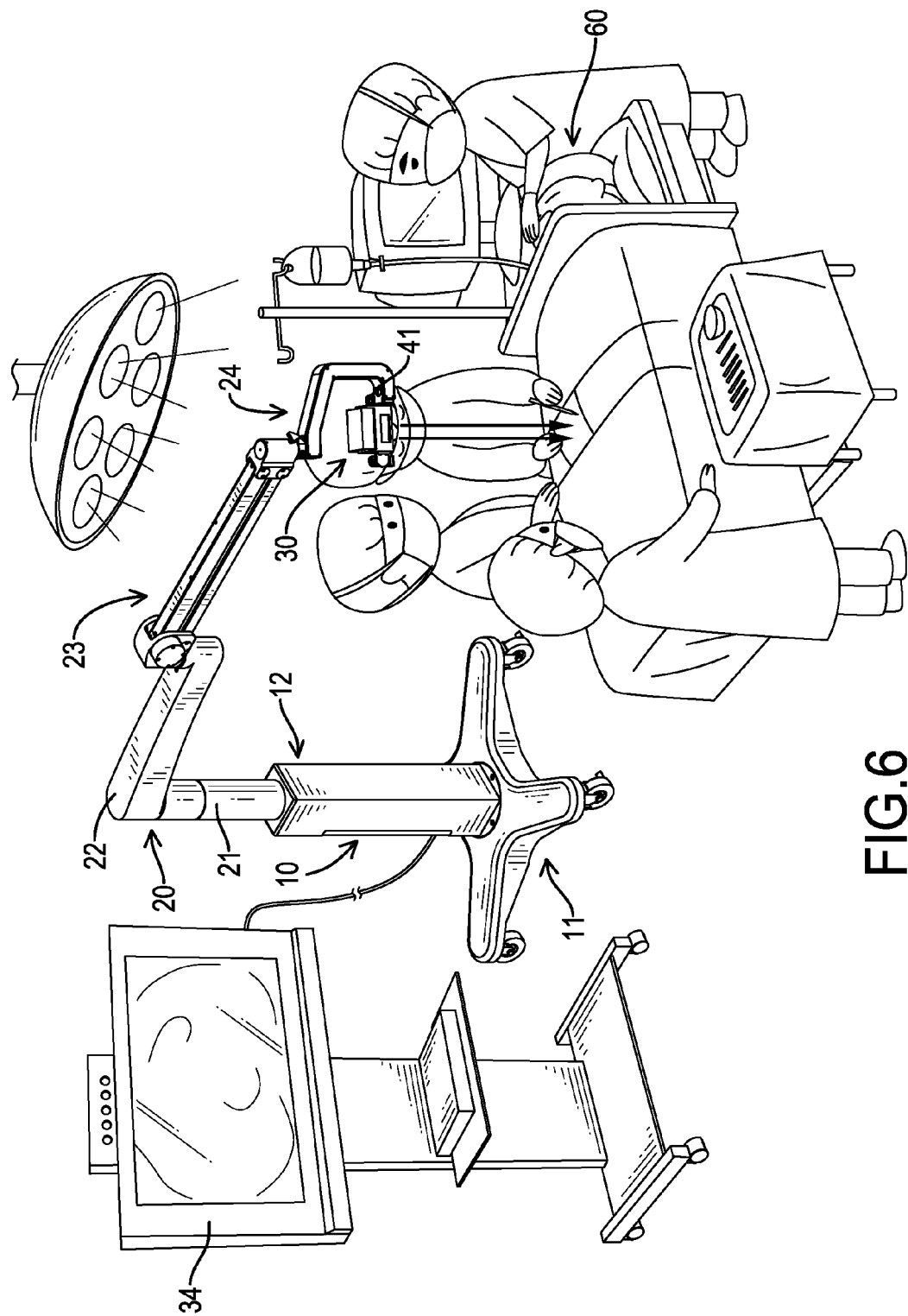
FIG. 6 is an operational perspective view of the lightweight 3D stereoscopic surgical microscope in FIG. 1.

In use, with reference to FIG. 6, a user or a doctor can move the lightweight 3D stereoscopic surgical microscope in accordance with the present invention by the wheel seat 11 to move the body 10 close to an inspected object 60 such as a human body, and to enable the at least one objective lens 32 of the image set 30 that is mounted on the bottom end of the rotating arm 24 to move over the inspected object 60. Then, the user can align the at least one objective lens 32 to the surgery or treatment position of the inspected object 60 by operating the operating bars 41 to control the movement and the rotation of the transversal lever 22, the lifting arm 23, and the rotating arm 24 of the robot set 20. Then, the at least one objective lens 32 can capture images of the surgery or treatment position of the inspected object 60 and transfer the captured images to the host computer 13 of the body 10, and the program processing interface of the host computer 13 can process and synthesize the captured images to form a 3D image. Finally, the 3D image can be sent to the main display screen 33 and the auxiliary display screen 34 to show the 3D image that is related to the surgery or treatment position of the inspected object 60. Then, the users and the participants in the medical education can see the 3D image via the main display screen 33 and the auxiliary display screen 34.

According to the above-mentioned technical features, the present invention combines the technologies of the body 10 (programming and human machine interface; HMI), the robot set 20 (mechanism), and the image set 30 (optical and semiconductor elements), and uses the main display screen 33 and the auxiliary display screen 34 to replace the eyepiece sets of the conventional 3D stereoscopic surgical microscope. Then, the doctor can see the 3D image of the surgery or treatment position of the inspected object 60 directly via the main display screen 33 and the auxiliary display screen 34, and this is a great help for clinical surgery or treatment. Furthermore, multiple people can simultaneously and instantaneously observe the operation in a medical education without being limited by the number of the eyepiece set.

In addition, the structure of the lightweight 3D stereoscopic surgical microscope is simplified to reduce the total volume and the total weight of the lightweight 3D stereoscopic surgical microscope (the volume can be to one-sixth of a volume of Leica UTL 500 a microscope). Then, the users can move and operate the lightweight 3D stereoscopic surgical microscope conveniently and flexibly, and this also can improve the fluency and efficiency of surgery. Furthermore, the 3D images that are shown on the main display screen 33 or the auxiliary display screen 34 can help the doctors to perform the surgery on organs or tissues of complex and varied thicknesses quickly and accurately, and this can significantly enhance the medical practicability of the lightweight 3D stereoscopic surgical microscope.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A lightweight 3D stereoscopic surgical microscope having:
    a body having
        a wheel seat having a top;
        a housing securely mounted on the top of the wheel seat and having a top side; and
        a host computer mounted in the housing and having a program processing interface;
    a robot set connected to the body, electrically connected to the host computer, and having
        a base securely mounted on the top side of the housing above the wheel seat and having a top end;
        a transversal lever rotatably mounted around the top end of the base to transversally move relative to the base, and having a mounting end opposite to the base;
        a lifting arm pivotally connected to the mounting end of the transversal lever, and having
            a pivot end pivotally connected to the mounting end of the transversal lever; and
            a connecting end opposite to the mounting end of the transversal lever; and
        a rotating arm rotatably connected to the connecting end of the lifting arm, and having
            a top end rotatably connected to the connecting end of the lifting arm; and
            a bottom end;
    an image set connected to the robot set, electrically connected to the body, and having
        an outer casing securely mounted on the bottom end of the rotating arm and having
            a bottom side; and
            an outer side;
        at least one objective lens mounted in the outer casing and facing the bottom side of the outer casing;
        a main display screen securely mounted on the outer side of the outer casing and electrically connected to the host computer of the body; and
        an auxiliary display screen electrically connected to the host computer beside the body; and
    an operating set connected to the robot set, electrically connected to the body and the image set, and having
        two operating bars securely mounted on the rotating arm beside the main display screen of the image set.

2. The lightweight 3D stereoscopic surgical microscope as claimed in claim 1, wherein
    the rotating arm has a connecting frame being U-shaped and connected to the bottom end of the rotating arm;
    the outer casing is securely mounted in the connecting frame; and
    the two operating bars are securely mounted on the connecting frame beside the main display screen.

3. The lightweight 3D stereoscopic surgical microscope as claimed in claim 1, wherein
    the outer casing has an opening formed through the bottom side of the outer casing; and
    the at least one objective lens is mounted in the outer casing and faces the bottom side of the outer casing in a range of the opening of the outer casing.

4. The lightweight 3D stereoscopic surgical microscope as claimed in claim 2, wherein
    the outer casing has an opening formed through the bottom side of the outer casing; and
    the at least one objective lens is mounted in the outer casing and faces the bottom side of the outer casing in a range of the opening of the outer casing.

5. The lightweight 3D stereoscopic surgical microscope as claimed in claim 3, wherein the image set has two objective lenses mounted in the outer casing at a spaced interval.

6. The lightweight 3D stereoscopic surgical microscope as claimed in claim 4, wherein the image set has two objective lenses mounted in the outer casing at a spaced interval.

7. The lightweight 3D stereoscopic surgical microscope as claimed in claim 5, wherein the wheel seat has
    an annular surface;
    multiple extending legs radially formed on and protruding from the annular surface of the wheel seat, and each one of the extending legs having a free end and a bottom side; and
    multiple wheels, and each one of the wheels securely connected to the bottom side of one of the extending legs at the free end of the corresponding extending leg.

8. The lightweight 3D stereoscopic surgical microscope as claimed in claim 6, wherein the wheel seat has
    an annular surface;
    multiple extending legs radially formed on and protruding from the annular surface of the wheel seat, and each one of the extending legs having a free end and a bottom side; and
    multiple wheels, and each one of the wheels securely connected to the bottom side of one of the extending legs at the free end of the corresponding extending leg.

9. The lightweight 3D stereoscopic surgical microscope as claimed in claim 7, wherein the lifting arm has an angle hinge unit between the mounting end of the transversal lever and the pivot end of the lifting arm to enable the connecting end of the lifting arm to longitudinally move relative to the mounting end of the transversal lever.

10. The lightweight 3D stereoscopic surgical microscope as claimed in claim 8, wherein the lifting arm has an angle hinge unit between the mounting end of the transversal lever and the pivot end of the lifting arm to enable the connecting end of the lifting arm to longitudinally move relative to the mounting end of the transversal lever.

11. The lightweight 3D stereoscopic surgical microscope as claimed in claim 9, wherein the rotating arm has a rotating hinge unit mounted between the connecting end of the lifting arm and the top end of the rotating arm to enable the rotating arm to rotate relative to the connecting end of the lifting arm.

12. The lightweight 3D stereoscopic surgical microscope as claimed in claim 10, wherein the rotating arm has a rotating hinge unit mounted between the connecting end of the lifting arm and the top end of the rotating arm to enable the rotating arm to rotate relative to the connecting end of the lifting arm.

13. The lightweight 3D stereoscopic surgical microscope as claimed in claim 1, wherein the wheel seat has
    an annular surface;
    multiple extending legs radially formed on and protruding from the annular surface of the wheel seat, and each one of the extending legs having a free end and a bottom side; and
    multiple wheels, and each one of the wheels securely connected to the bottom side of one of the extending legs at the free end of the corresponding extending leg.

14. The lightweight 3D stereoscopic surgical microscope as claimed in claim 2, wherein the wheel seat has
   an annular surface;
   multiple extending legs radially formed on and protruding from the annular surface of the wheel seat, and each one of the extending legs having a free end and a bottom side; and
   multiple wheels, and each one of the wheels securely connected to the bottom side of one of the extending legs at the free end of the corresponding extending leg.

15. The lightweight 3D stereoscopic surgical microscope as claimed in claim 1, wherein the lifting arm has an angle hinge unit between the mounting end of the transversal lever and the pivot end of the lifting arm to enable the connecting end of the lifting arm to longitudinally move relative to the mounting end of the transversal lever.

16. The lightweight 3D stereoscopic surgical microscope as claimed in claim 2, wherein the lifting arm has an angle hinge unit between the mounting end of the transversal lever and the pivot end of the lifting arm to enable the connecting end of the lifting arm to longitudinally move relative to the mounting end of the transversal lever.

17. The lightweight 3D stereoscopic surgical microscope as claimed in claim 1, wherein the rotating arm has a rotating hinge unit mounted between the connecting end of the lifting arm and the top end of the rotating arm to enable the rotating arm to rotate relative to the connecting end of the lifting arm.

18. The lightweight 3D stereoscopic surgical microscope as claimed in claim 2, wherein the rotating arm has a rotating hinge unit mounted between the connecting end of the lifting arm and the top end of the rotating arm to enable the rotating arm to rotate relative to the connecting end of the lifting arm.

\* \* \* \* \*